United States Patent [19]
Snyder

[11] Patent Number: 5,927,732
[45] Date of Patent: Jul. 27, 1999

[54] ALL TERRAIN RIDING SLED

[76] Inventor: Ronald M. Snyder, 5601 Aven Rd., Marietta, Ga. 30068

[21] Appl. No.: 08/936,217

[22] Filed: Sep. 25, 1997

[51] Int. Cl.[6] ....................................................... B62M 1/00
[52] U.S. Cl. .................................. 280/87.01; 280/87.042; 280/87.043
[58] Field of Search ........................ 280/87.041, 87.042, 280/47.11, 11.28, 87.01, 87.043

[56] References Cited

U.S. PATENT DOCUMENTS

| | | | |
|---|---|---|---|
| 1,364,612 | 1/1921 | Church | 280/87.01 |
| 1,502,337 | 7/1924 | Hass et al. | 280/87.01 |
| 2,103,998 | 12/1937 | Birkhead | 280/87.01 |
| 3,039,784 | 6/1962 | Davis . | |
| 3,870,334 | 3/1975 | Cole | 280/87.01 |
| 4,098,519 | 7/1978 | Reid, Jr. . | |
| 4,134,599 | 1/1979 | DiMille et al. . | |
| 4,384,731 | 5/1983 | Webb . | |
| 5,020,621 | 6/1991 | Martin . | |
| 5,354,081 | 10/1994 | Huffman et al. . | |
| 5,782,480 | 7/1998 | Phillips | 280/282 |

*Primary Examiner*—Lanna Mai
*Assistant Examiner*—Faye M. Fleming
*Attorney, Agent, or Firm*—Rodgers & Rodgers

[57] ABSTRACT

An all terrain riding sled comprising a seat element with two pairs of wheel assemblies extending downwardly therefrom and being spaced apart, a steering bar operably interconnected with one pair of wheel assemblies, and a braking system operably interconnected with the other pair of wheel assemblies.

3 Claims, 2 Drawing Sheets

ALL TERRAIN RIDING SLED

BACKGROUND OF THE INVENTION

This invention relates to a recreational riding sled which is enjoyable, safe and versatile. Known sled or skate-board type devices are often ridden in a standing position on hard surfaces such as streets and sidewalks. Of course, Of one falls off such a device while riding standing up, severe injury can and often does result. Other devices are ridden in a reclining or prone position which greatly limits control and maneuverability.

By this invention, a riding sled is provided which is capable of being ridden in a seated position with the rider in full control by means of a reliable braking system coupled with a convenient steering mechanism. In addition, the sled is operable not only on hard surfaces but also is readily movable over soft terrain such as grass and dirt.

SUMMARY OF THE INVENTION

By this invention, an all terrain riding sled is provided and includes a seat element with two pairs of wheel assemblies extending downwardly therefrom, a steering bar attached to one pair of wheels at one end of the seat element, a braking system secured to the seat element and being operably interconnected to the other pair of the wheel assemblies, and a pair of handles secured to the seat element and being disposed respectively in a pair of apertures formed in the seat element.

DESCRIPTION OF THE PREFERRED EMBODIMENT

Figure 1:
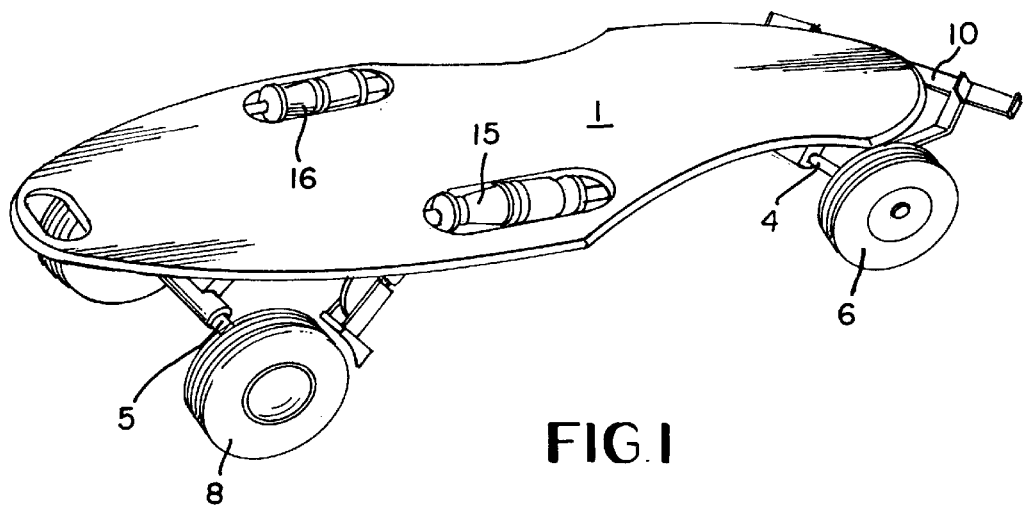
FIG. 1 is a perspective view of an all terrain riding sled according to this invention.
Figure 2:
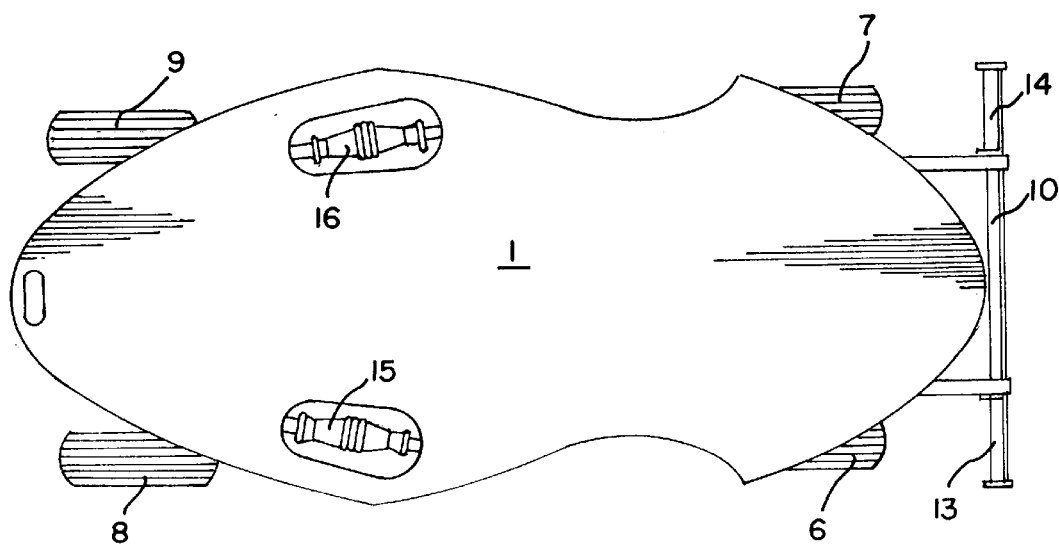
FIG. 2 is a top plan view.
Figure 3:
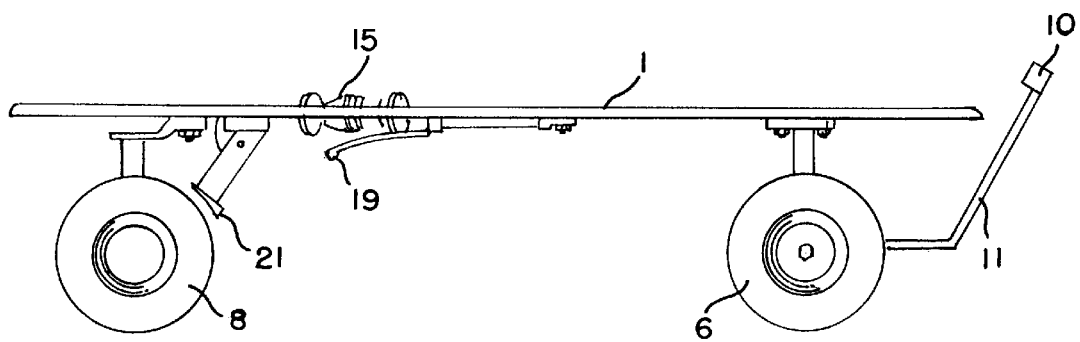
FIG. 3 is a side elevational view.

In the drawings, the numeral 1 designates the elongated seat element of the all terrain riding sled according to this invention. Disposed on the underside of seat 1 are front bracket 2 and rear bracket 3 which are attached thereto by any suitable means such as rivets, screws or adhesive. Rotatably mounted in front bracket 2 and rear bracket 3, in known manner, are axles 4 and 5, respectively. Also, in known manner, wheels 6 and 7 are mounted, respectively, on the ends of axle 4 and, in like manner, wheels 8 and 9 are mounted, respectively, on the ends of axle 5.

For the purpose of steering the sled, steering bar 10 is provided and is attached to axle 4 by means of connecting rods 11 and 12. Also, steering bar 10 is provided with foot receiving sections 13 and 14.

In order to maintain balance and security while riding the sled, means is provided in the form of handles 15 and 16 which are disposed in apertures 17 and 18 of seat element 1. Specifically, handles 15 and 16 are secured integrally at the ends thereof to seat element 1 about the peripheries of apertures 17 and 18, respectively.

Figure 4:
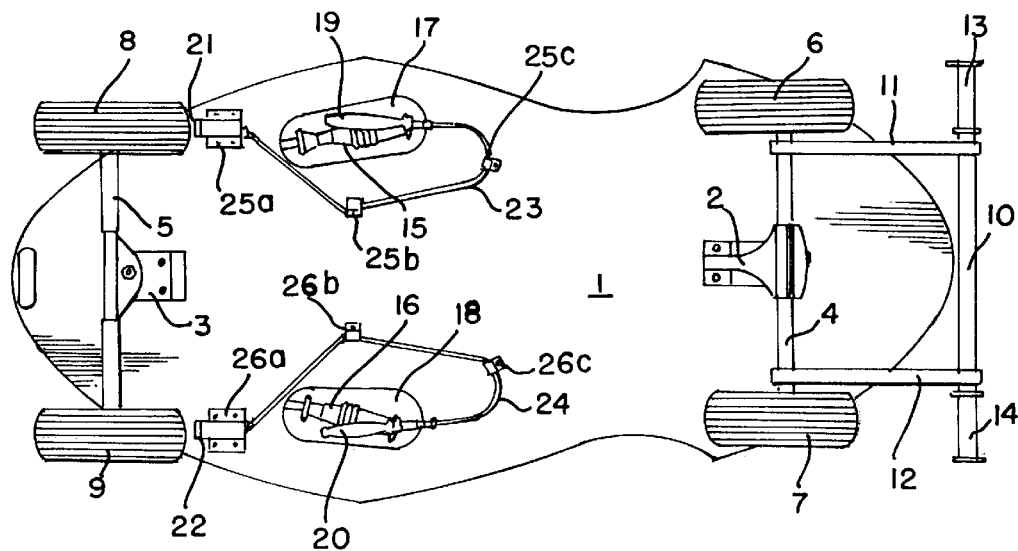
FIG. 4 is a bottom plan view.
Figure 5:
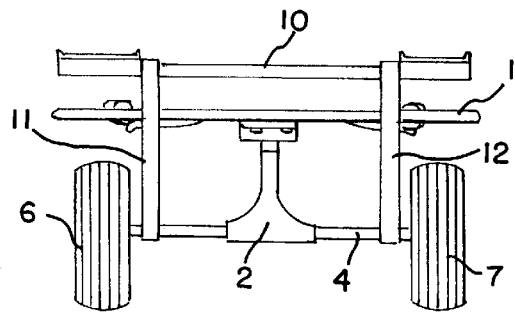
FIG. 5 is a front elevational view.
Figure 6:
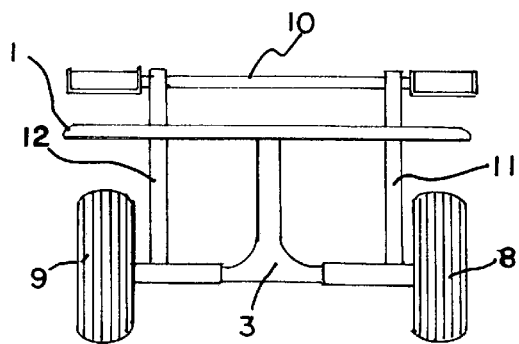
FIG. 6 is a rear elevational view.

The braking system is best shown in FIG. 4 and includes braking bars 19 and 20 which are interconnected, respectively, to brake pads 21 and 22 by means of cable assemblies 23 and 24, as is well known in the art. Further, cable assembly 23 is attached to the underside of seat element 1 by means of brackets 25a, 25b and 25c and, similarly, cable assembly 24 is attached to the underside of seat element 1 by means of brackets 26a, 26b, and 26c.

In operation, a rider sits on the upper surface of seat element 1 and extends his or her hands through apertures 17 and 18 and then grips handles 15 and 16. The rider's feet are then placed in the respective foot receiving sections 13 or 14. With the sled positioned on a downwardly inclined slope, the sled will naturally move forward and can be turned by simply pushing the appropriate foot receiving section 13 or 14 thereby causing bracket 2, axle 4 and wheels 6 and 7 to torque to the left or right thereby causing the sled to turn in the desired direction.

In order to stop or slow the sled, braking bars 19 and 20 are simply squeezed causing brake pads 21 and 22 by means of cable assemblies 23 and 24 to extend into frictional engagement, respectively, with rear wheels 8 and 9 thereby slowing or stopping the sled as desired.

In order for the sled to be adaptable to varying types of surfaces, wheels 6–9 are spaced from seat element 1 approximately 7 cm. This allows sufficient clearance between the wheels and the seat element thereby preventing undesirable debris and the like from lodging between the wheels and the seat element. In order for the sled to be adaptable for off-road use, wheels 6–9 are configured with threads and are of substantial width.

Therefore, by this invention an individual is able to ride a recreational sled in a sitting position because the vehicle is steered with the rider's feet, and controlled by a readily accessible braking system. Also, any danger of falling off is prevented by the handle means which is secured to the seat element.

I claim:

1. An all terrain riding sled comprising an elongated planar seat element, said seat element having front and rear ends, at least two pairs of wheel assemblies secured to the underside of said seat element, said pairs of wheel assemblies disposed adjacent said ends of said seat element respectively, each of said pairs comprising a pair of wheels, said wheels spaced vertically from said seat element, a steering bar attached to one of said pairs of wheel assemblies, a manual braking system operably interconnected with the other of said pairs of wheel assemblies, a pair of apertures being formed in said seat element, a pair of handles disposed respectively in said apertures and disposed in a coplanar relationship with said seat element and being secured to said seat element, said braking system comprising a pair of braking bars, and said pair of braking bars being connected respectively to said handles.

2. A sled according to claim 1 wherein foot receiving sections are disposed on the ends, respectively, of said steering bar.

3. A sled according to claim 1 wherein each of said wheel assemblies comprises a pair of wheels and said wheels are spaced approximately 7 cm from said seat element.

* * * * *